Nov. 29, 1955  C. A. SANFT  2,724,982
HAND BRAKE LINKAGE
Filed Feb. 3, 1951  2 Sheets-Sheet 1
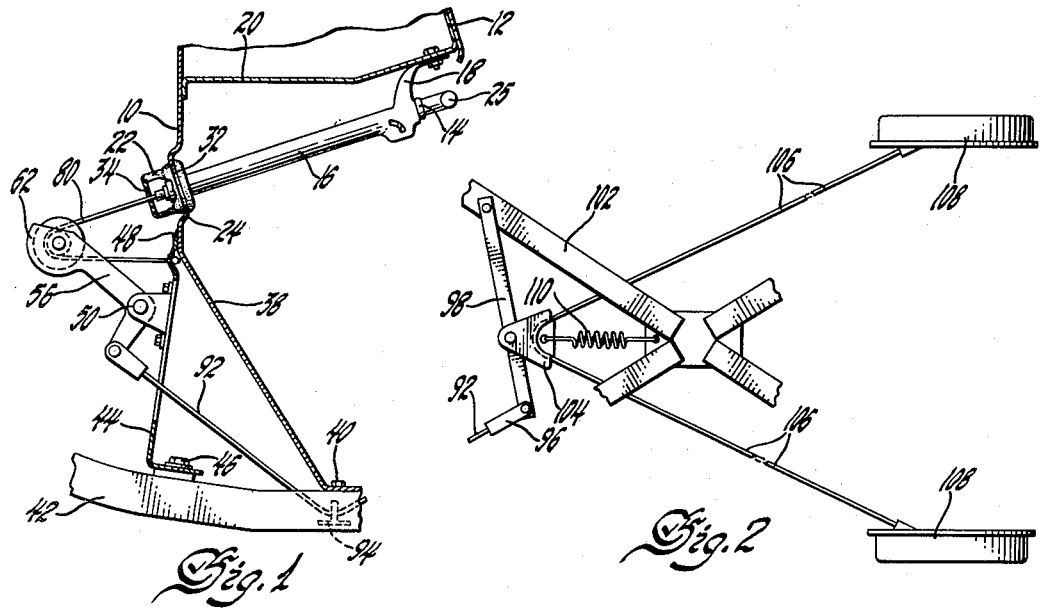
Fig.1
Fig.2
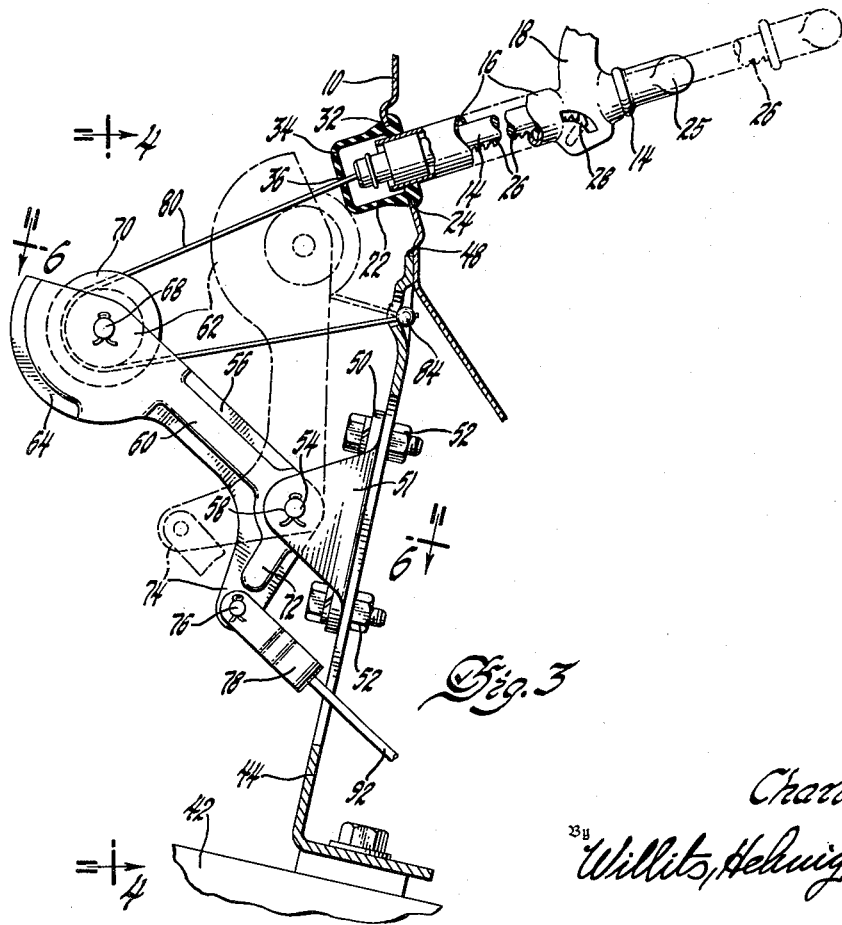
Fig.3
Inventor
Charles A. Sanft
By Willits, Helwig & Baillio
Attorneys

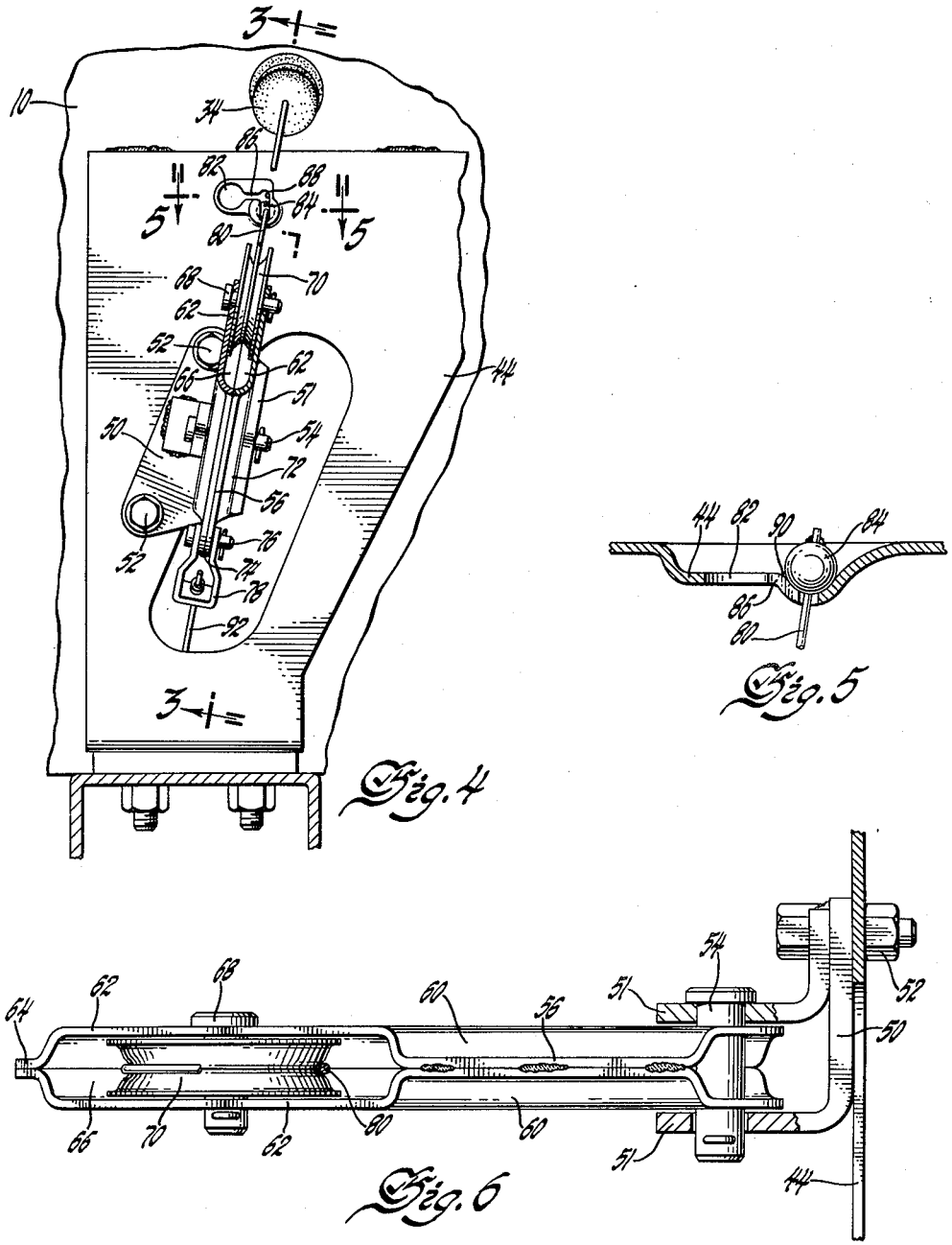

United States Patent Office 2,724,982
Patented Nov. 29, 1955

2,724,982

HAND BRAKE LINKAGE

Charles A. Sanft, Pontiac, Mich., assignor to General Motors Corporation, Detroit, Mich., a corporation of Delaware Application February 3, 1951, Serial No. 209,300

9 Claims. (Cl. 74—502)

This invention relates to an improved cable and lever control mechanism and more partciularly to an improved brake control mechanism consisting of the cable and lever arrangement mounted on the frame of a vehicle.

The hand brake control for the emergency or parking brake on passenger vehicles generally consists of a cane or pull type hand brake rod mounted beneath the dash panel of the vehicle. Since the hand brake rod is normally mounted beneath the dash and is pulled rearwardly by the operator of the vehicle to apply the brakes and since the brake cables beneath the floor of the vehicle must be moved forward to provide the brakes, it is necessary to provide an interconnecting linkage to reverse the direction of movement of the brake control and to provide some mechanical advantage if this is necessary. Perhaps the way this connection is generally made is by means of a reversely bent cable which passes through a sheath fixed to the vehicle frame. Since the cable is quite stiff and requires an arc having a large diameter in order to bend it through 180 degrees, the cable begins adjacent the lower end of the brake rod and turns in a generally sweeping curve and terminates adjacent the frame just below the floorboards. Thus it is necessary to employ several feet of sheath for the cable. During brake operation there is considerable sliding friction between this sheath and cable. This friction reduces the possible braking effect of the emergency or the parking brake. Another arrangement provided a lever pivoted midway between the brake rod and the floorboards with the upper end positioned adjacent the brake rod and connected thereto and the lower end extending just below the floorboard and connected to the brake cable mechanism. This arrangement though quite satisfactory from an efficiency viewpoint, required an exceptionally long lever. The present automotive designs have so reduced the size of the engine compartment that there is no longer room for a long lever of this type. Thus it has been necessary to employ a more compact lever and cable arrangement which would transfer the brake actuating motion from the rod to the brake cable.

The applicant has provided a more compact and improved lever and cable arrangement for transferring the brake actuating movement from the hand brake rod to the cable mechanism beneath the floorboards of the vehicle. The mechanism consists of a ball crank lever having a pulley pivoted to the long arm of the lever. The bell crank lever is pivoted at its knee to the fire wall or dash panel of the vehicle. The hand brake rod is connected to the lever by means of a cable attached to the end of the rod and running over the pulley on the end of the lever and returning substantially parallel to itself and being attached to the dash panel of the vehicle. The short end of the bell crank lever is connected by a clevis to the cable which actuates the emergency brakes at the rear of the vehicle. This simple arrangemnt reverses the direction of the movement of the hand brake control system and provides mechanical advantage equal to a lever having a long arm twice the length of the lever here used. Thus it will be seen that this system will take much less space than a conventional system providing the same mechanical advantage. The object of the invention provides an improved and more compact motion reversing mechanism in a brake cable control mechanism for vehicles.

A further object of the invention is to provide in a brake cable control mechanism, an improved cable and lever mechanism in which the cable is connected to the lever so as to provide twice the mechanical advantage in order to reduce the length of the lever so that the mechanism may fit in a small space.

Another object of the invention is to provide in a cable and lever control mechanism a mechanical advantage connection between the lever and cable so that the lever moves half the speed of the cable.

These and other objects of the invention will be more apparent from the following drawings and description of a preferred embodiment of the invention.

Figure 1 shows a partial vertical sectional view of the vehicle instrument panel and dash panel with the hand brake rod and the new cable and lever control mechanism.

Figure 2 is a partial vertical plan view of the cable mechanism connected to the rear brakes.

Figure 3 is an enlarged partial view showing the dash panel and the cable and lever control system.

Figure 4 is a partial sectional view taken on the line 4—4 of Figure 3.

Figure 5 is a detailed view showing the cable anchorage in the dash panel taken on the line 5—5 of Figure 4.

Figure 6 is a partial sectional view taken on the line 6—6 of Figure 3.

The general arrangement of a preferred embodiment of the invention is illustrated in Figures 1 and 2. Figure 1 is a vertical section of a portion of a conventional automotive vehicle and shows the hand controls mounted on the dash panel 10 and the instrument panel 12. Figure 2 is a horizontal section of a portion of a conventional automotive vehicle and shows a partial view of the structure beneath the floorboard of the vehicle which is normally used to operate the hand or emergency brakes of the vehicle. Thus considering Figures 1 and 2 as a unit the complete lever and cable system for connecting the hand brake control rod 14 to the brakes at the rear wheels is illustrated.

The hand brake control rod 14 is reciprocally mounted in a supporting tube 16 which has an upwardly extending bracket 18 at the forward end adjacent the handle end of the control rod. The bracket 18 is suitably secured to a brace 20 which connects the dash panel 10 and the instrument panel 12. The forward end of the support tube 16 is slidably supported in a rubber bushing 22 which is suitably secured in an aperture 24 in the dash panel 10.

Referring to Figure 3 it will be seen that the hand control rod 14 has a handle 25 and ratchet teeth 26 which are engaged by a spring actuator pawl 28 pivotally mounted in the support tube 16. Thus it will be seen that the operator may grasp the handle 25 in the conventional manner and pull the control rod 14 outwardly. The ratchet 26 and pawl 28 will retain the control rod 14 in any position. In order to release the control rod, the handle 25 is rotated to disengage the ratchet teeth 26 from the pawl and allow the brake mechanism to return the rod 14 into the support tube 16. Referring to Figure 3 it will be seen that the rubber bushing 22 has an annular groove 32 to secure it in the opening 24. The bushing 22 also has integrally formed therewith a dirt seal which consists of a cylindrical extension portion 34 having an end portion 36 suitably apertured to allow the cable to pass through it but to prevent dirt and other foreign matter from entering the driver's compartment of the vehicle through this aperture.

The dash panel 10 has a sloped portion 38 beginning just below the point where the tube 16 is supported in the dash panel. The lower end of the sloped portion 38 of the dash panel is suitably secured by means such as bolts 40 to the frame 42 of the automotive vehicle. A brace and support member 44 is secured to the frame 42 by suitable means such as bolts 46 and to the vertical portion of dash panel 10 by means such as welding 48. Referring to Figure 1 it will be seen that the support 44 provides a substantially vertical extension of the dash panel 10 which is used as a supporting wall or plate. A bracket 50 is formed on or secured to the support 44 by securing means 52. The bracket 50 has apertured ears 51 to support the pintle pin 54. A bell crank lever 56 has a pivot aperture 58 at the knee of the lever which is pivotally mounted on the pin 54. The bell crank lever 56 is made of two similar bell crank sections welded together in face to face relation. Referring to Figures 3 and 6 it will be seen that each of these sections has two channel shaped arms with laterally extending flanges. The flanges of each section meet and are welded together to form a box shaped lever. The long arm 60 of the bell crank lever 56 has a box shaped portion extending approximately half its length and an enlarged portion at the outer end. The outer surface of the box shaped portion and the enlarged portion are substantially in the same plane. The enlarged portion is rounded at one side and substantially straight at the other side. The rounded side of the enlarged portion 62 has facing flanges 64 which are welded together and at the other side of the enlarged portion 62 the sides of the lever 56 are spaced. Thus a pocket 66 best illustrated in Figure 6 is formed in the outer end of the long lever arm 60. The walls of the enlarged portion 62 are suitably apertured to support a bearing pin 68 which provides a shaft for the pulley 70 positioned in the cavity 66 of the housing formed by walls 62. The short arm 72 of the lever has a similar boxed section in its intermediate portion and at the outer end an axially extending flange portion 74 is provided. The extending flange portion 74 is suitably apertured to receive a pivot pin 76 to connect the lever to a clevis 78.

The hand brake control rod 14 is connected in a suitable manner to a cable 80. This cable runs over the pulley or sheath 70 within the cavity 66 and turns approximately 180 degrees to return parallel to itself and is secured to the support 44. As best shown in Fig. 3 the anchored portion of the cable 80 approaching the pulley 70 during brake application is within the cavity 66. Thus the side walls 62 will prevent foreign objects from lodging between the cable 80 and the pulley 70. The novel securing means for the anchored end of the cable 80 is best illustrated in Figures 4 and 5. The supporting plate 44 has an enlarged aperture 82 of sufficient size to receive the ball abutment 84 which is secured on the end of the cable 80. A connecting slot 86 leads horizontally from the center of the aperture 82 to a vertical slot 88. The vertical slot 88 extends downwardly from the connecting slot 86 and at its lower end a semispherical seat 90 is provided in the support 44. This construction provides a readily detachable anchorage for the cable 80 in the plate 44.

The bell crank lever 56 is connected to the brake mechanism of the vehicle through the clevis 78 attached to the short lever arm 72. The cable 92 is attached in the conventional manner to the clevis 78 and extends downwardly beneath the floorboards through a guide 94 suitably secured to the frame member 42. From the guide 94 the cable 92 extends horizontally cross the vehicle beneath the floorboards as best illustrated in Figure 2 to the clevis 96. The clevis 96 is pivotally connected to the horizontal brake lever 98 which is suitably pivoted to the bracing member 102 of the frame 42. A bracket 104 is pivotally connected to the horizontal lever 98 and slidably connected to the cable loop 106 which is connected to each of the rear brakes 108. In order to return the brake system to the disengaged position, a strong tension spring 110 is connected between the frame bracing 102 and the bracket 104.

Though it is believed that the operation of the device will be quite clear from the description of the structural features of the applicant's specific embodiment, it is believed desirable to briefly outline the operation of this brake control system. The operator actuates the brakes by grasping the handle 25 and pulling toward himself. When he has moved the handle and its accompanying rod 14 and control system sufficiently to apply the brakes he releases the handle. The return of the rod 14 and connected control system wil be prvented by engagement of the ratchet teeth 26 and pawl 28. In order to release the brakes it is only necessary to rotate the handle to disengage the ratchet teeth from the pawl. Suitable means such as a spring or cam (not shown) are also generally provided to return the handle and rod 14 to the normal position to reengage the ratchet teeth and pawl when the handle is returned to the brake disengaged position. The rod 14 is connected to the long arm 60 of the bell crank lever 56 by means of the cable 80 which runs over the free pulley 62 and is fixed to the support 44. Thus when the handle 25 and rod 14 are moved a certain distance, the end of the long arm 60 only moves approximately half that distance. Thus this connection provides a mechanical advantage equiavlent to that found in a system of this type where the long lever arm is twice the length of this lever arm. The short lever arm is then connected by the cable 92 to the horizontal brake lever beneath the car. This lever is then connected to each of the brakes 108 by the loop lever 106. The lever and cable control system is returned to its neutral or brake disengaged position by tension spring 110 secured between the frame 102 and the bracket 104.

The above detailed description of the preferred embodiment of the invention is not to be considered as limiting the invention since many modifications of the structure may be made by those skilled in the art within the scope of the invention.

I claim:

1. In a brake system, a supporting wall, a brake rod guide mounting supported on and extending away from one side of said supporting wall, a brake rod mounted in said guide mounting for reciprocating movement, ratchet means on said guide mounting to engage and hold said brake rod in applied position, actuated means passing thru said supporting wall closely adjacent said guide mounting, a bell crank lever having a long and a short arm pivotally mounted on and extending away from the other side of said supporting wall between said guide mounting and said actuated means, said bell crank lever having a substantially sector shaped hollow housing providing a cavity at the end of the long arm, a pulley rotatably mounted in said housing on an axis transverse to said brake rod with more than half of said pulley in said housing, a cable attached to said brake rod and passing through said wall, and outwardly to said pulley and over said pulley and returning substantially parallel to itself to said wall between said guide mounting and said lever, means to secure said cable to said wall, said actuated means being secured to the end of the short arm of said bell crank lever.

2. In a control system, a supporting wall, a rod support mounting on one side of said supporting wall, a rod mounted in said guide mounting for reciprocating movement, ratchet means on said guide mounting to engage and hold said rod in applied position, actuated means passing through said supporting wall closely adjacent said guide mounting, a bell crank lever having a long and a short arm pivotally mounted on and extending away from the other side of said supporting wall between said guide mounting and said actuated means, said bell crank lever having a housing open at one side at the end of the long arm, a pulley rotatably mounted in said housing on an axis transverse to said brake rod and having a minor portion projecting from said housing, a cable attached to said rod and passing through said wall, and outwardly into said housing to said pulley and over said pulley, and returning out of said housing substantially parallel to itself to said wall between said guide mounting and said lever, means to secure said cable to said wall, said actuated means being secured to the end of the short arm of said bell crank lever.

3. In a control system, a support plate, operating means mounted on said support plate, a lever pivotally mounted on one side of said support plate, a pulley pivotally mounted on said lever, a depression in the other side of said support plate, an aperture in said support plate adjacent said depression, a narrow slot having a portion extending horizontally from said aperture and a portion extending downwardly to the center of said depression in the same plane in said support plate, a cable attached to said operating means and extending outwardly to said pulley and over said pulley and backwardly, said backwardly extending portion of said cable having an abutment smaller than said aperture for insertion in said slot and being normally seated in said depression, and actuated means secured to said lever.

4. In a control system, support means, operating means mounted on said support means, operated means mounted on said support means, said support means having a depression and an aperture adjacent said depression, a narrow slot in a flat planar portion of said support means between said depression and aperture having a portion extending horizontally from said aperture and a portion extending downwardly to said depression, a cable attached to said operating means and said operated means and said cable having an abutment smaller than said aperture for insertion in said slot and being normally seated in said depression to anchor said cable to said support means.

5. In a control system, support means, a cable, a depression in said support means, an aperture in said support means adjacent said depression, a narrow slot being substantially in one plane for said cable having a first part extending in said plane in one direction and a second part extending in said plane in a direction at an angle to the direction of said first part and terminating in said depression, an abutment member smaller than said aperture on said cable to permit passing the abutment and cable through said support and the said cable through said slot and said abutment being positioned in said depression.

6. In a control system, support means, a rod mounted on said support means having a reciprocating portion, means to hold said rod in applied position, a bell crank lever pivotally mounted on said support means, said bell crank lever having a hollow housing forming a cavity at one end, a pulley pivotally mounted in said housing, a cable attached to said rod and having a portion extending outwardly to said pulley and a portion extending over said pulley and a portion extending backwardly substantially parallel to itself, said backwardly extending portion leaving said pulley within said housing to prevent foreign objects fouling said pulley and cable, said backwardly extending portion of said cable being secured to said support means, and actuated means secured to the other end of said bell crank lever.

7. In a control system, support means, operating means mounted on said support means, a lever pivoted on said support means, said lever consisting of two parts secured together at their meeting edges and having spaced side walls, the central portion of said lever having a hollow box section, an end portion of said lever having a hollow housing formed between the spaced side walls of said lever, said side walls extending toward each other and being secured together at one edge of said housing to form a wall and being spaced at the other edge to provide an opening, a pulley having a major portion positioned in said housing and having a minor portion extending out of said housing at said other edge, said pulley being pivoted to said parts forming the side walls of said housing, a cable extending from said brake operating means over said pulley and returning, said cable being anchored to said support, and operated means attached to said cable.

8. In a control system, support means, operating means mounted on said support means, a lever centrally pivoted on said support means, said lever consisting of two parts having spaced side walls secured together at their meeting edges, the central portion of said lever having a hollow box section, one end portion of said lever having a hollow housing formed between the spaced side walls of said lever, said side wall parts extending toward each other and being secured together at one edge of said pocket and being spaced at the other edge to provide an opening, a pulley positioned substantially within said housing and having a portion extending out of said housing at said other edge, said pulley being pivoted to said parts forming the side walls of said housing, a cable extending from said brake operating means over said pulley, leaving said pulley within said housing to prevent fouling and returning toward said support, said cable being anchored to said support, the other end portion of said lever having a flat portion formed by securing flat portions of said parts together in face to face relation, and operated means attached to said cable.

9. In a control system, support means, operating means mounted on said support means, a bell crank lever having two arm portions pivoted on said support means, said lever consisting of two complementing half section parts extending the full length of said lever and having spaced side walls, said arm portions of said lever having a hollow box section with both edges of said parts secured together along the longitudinal edge, the central portion of said lever having a U-section with one pair of edges of said parts secured together and said side walls and the other pair of edges of said parts in spaced relation, said side walls contacting said support means to provide lateral stability for said lever, an end portion of said lever having a hollow housing formed between the spaced side walls of said parts of said lever, said parts having edge portions extending toward each other and being secured together at one edge of said housing and being spaced at the other edge to provide an opening, a pulley positioned in said housing and pivoted to said side walls of said housing, a cable extending from said brake operating means over said pulley and returning to said support, said cable being anchored to said support, and operated means attached to said cable.

References Cited in the file of this patent

UNITED STATES PATENTS

| | | |
|---|---|---|
| 519,148 | Crampton | May 1, 1894 |
| 1,408,212 | Leinbach | Feb. 28, 1922 |
| 1,432,789 | Richards | Oct. 24, 1922 |
| 1,556,190 | Withrow | Oct. 6, 1925 |
| 1,646,643 | Dorsey | Oct. 25, 1927 |
| 1,718,258 | Schmidt | June 25, 1929 |
| 1,743,981 | Sauvage | Jan. 14, 1930 |
| 1,802,719 | Junkers | Apr. 28, 1931 |
| 2,136,095 | Baumheckel | Nov. 8, 1938 |
| 2,309,734 | Klotsch | Feb. 2, 1943 |